United States Patent [19]

Koide

[11] Patent Number: 5,181,137
[45] Date of Patent: Jan. 19, 1993

[54] LIGHT SCANNING APPARATUS

[75] Inventor: Jun Koide, Yokohama, Japan

[73] Assignee: Canon Kabushiki Kaisha, Tokyo, Japan

[21] Appl. No.: 630,788

[22] Filed: Dec. 21, 1990

Related U.S. Application Data

[63] Continuation of Ser. No. 396,357, Aug. 21, 1989, abandoned.

[30] Foreign Application Priority Data

Aug. 24, 1988 [JP] Japan ............................ 63-210165

[51] Int. Cl.⁵ ............................................. G02B 26/08
[52] U.S. Cl. .................................... 359/217; 359/206; 359/207; 346/108
[58] Field of Search ..................... 350/6.5-6.91; 359/202, 206, 220, 221, 212, 216, 217, 205, 207, 668, 711, 744; 250/234, 578.1; 346/108, 160

[56] References Cited

U.S. PATENT DOCUMENTS

| | | | |
|---|---|---|---|
| 4,390,235 | 6/1983 | Minoura | 350/6.6 |
| 4,855,761 | 8/1989 | Hiiro | 346/108 |
| 4,962,983 | 10/1990 | Watanabe | 359/217 |

FOREIGN PATENT DOCUMENTS 0013215  1/1986  Japan ........................ 350/6.8

Primary Examiner—Bruce Y. Arnold
Assistant Examiner—James Phan
Attorney, Agent, or Firm—Fitzpatrick, Cella, Harper & Scinto

[57] ABSTRACT

A light scanning apparatus comprises a light source having a plurality of light emitting unit, a deflector for deflecting a plurality of light beams emanated from the light source, a first optical system which is for focusing the plural light beams deflected by the deflector and which is afocal in a refractive power in a sub-scan direction and has an f-θ characteristic in a refractive power in a scan direction, and a second optical system which is for directing the light beams from the first optical system to a predetermined plane and is provided for each of the light beams.

46 Claims, 8 Drawing Sheets

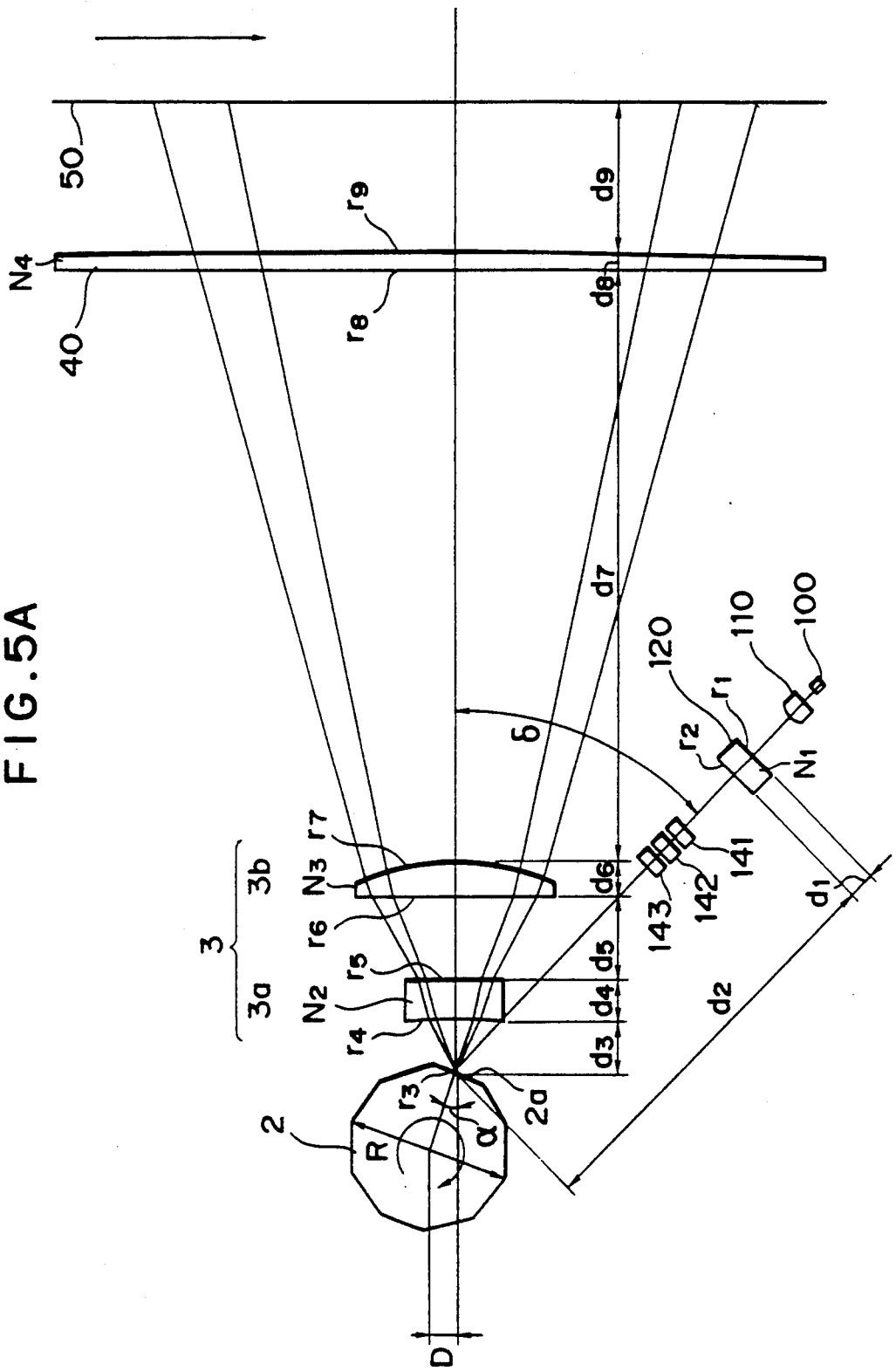

CURVATURE OF FIELD

DISTORTION FROM f·θ CHARACTERISTIC

LIGHT SCANNING APPARATUS

This application is a continuation of application Ser. No. 07/396,357 filed Aug. 21, 1989, now abandoned.

BACKGROUND AND SUMMARY OF THE INVENTION

The present invention relates to a light scanning apparatus (light scanner), and more particularly to a light scanner suitable to a color laser beam printer or multi-color laser beam printer having an electronic photographing process, which uses a plurality of laser beams to scan a plane which carries images.

In a prior art light scanner of a color laser beam printer (color LBP), a plurality of laser beams is used to scan an image carrier plane to write an image.

In general, in such a light scanner, a single laser beam is directed to each deflecting reflection plane of a light deflector which comprises a single polygon mirror, and an f-$\theta$ lens is provided for each of the laser beams reflected by the deflecting reflection plane. The light beam from the f-$\theta$ lens is used to scan the image carrier plane by utilizing an anamorphic plane having corrected for a skew of the deflecting reflection plane. Since one set of scanning optical system is provided for each of the laser beams, the entire apparatus tends to be of large size and complex.

In Japanese Laid-Open Patent Applications 61-92917 and 58-79215, two lights having different polarization characteristics are used or two lights having different wavelengths are utilized, and the two laser beams are combined into one beam. The laser beam is then focused by one half as many lens systems as the number of laser beams and the laser beam is directed to a vicinity of the plane to be scanned. Then, the laser beam is split into two by a polarization beam splitter or dichroic mirror to scan the image carrier planes.

In this method, since the two laser beams are combined and then it is split, the entire system is complex. Further, if a light scan angle on the scan plane is large, a light leakage takes place due to an incident angle characteristic of the polarization beam splitter or dichroic mirror when the lights are combined or split. As a result, the light scan angle should not be too large.

In U.S. Pat. No. 4,561,717, a plurality of laser beams are obliquely directed to a single deflecting reflection plane 520a of a single light deflector 520 having a rotating polygon mirror, applying a field angle at a right angle relative to light scan directions of the scan planes 561 and 562, as shown in FIG. 1. It is focused by an f-$\theta$ lens 530 which comprises a spherical lens system and split into a plurality of light beams by optical systems such as mirror systems 541 and 542 arranged at spaced positions from the laser beam, and then they are directed to image carrier planes 561 and 562 for scanning.

The laser beam obliquely directed to the f-$\theta$ lens 530 which comprises the spherical lens system causes bending of the scan line on the image carrier plane due to the optical characteristic of the f-$\theta$ lens. In the prior art, cylindrical lenses 551 and 552 are arranged in front of the image carrier plane to compensate for the bending of the image plane.

In this method, since the light beam is directed to the cylindrical lens with a scan angle (an image angle in the scan direction), an apparent refractive power of the cylindrical lens increases as the scan angle increases and the laser beam is focused in front of the scan plane. Namely, the bending of the image plane increases and spot diameters of the laser beam at the center of the scan range and a peripheral point are different from each other.

Where three or more laser beams are used, there are two or more oblique incident angles to the f-$\theta$ lens which comprises the spherical lens. If the oblique incident angles are different from each other, the f-$\theta$ lens characteristics of the scan line differ from each other due to the f-$\theta$ lens characteristics.

Namely, as shown in FIG. 1, since the skewed light beam is directed to the f-$\theta$ lens 530 which comprises the spherical lens system, the f-$\theta$ characteristic is distorted and changed depending on the oblique incident angle.

The f-$\theta$ characteristic of the scan line in the scan direction relative to the oblique incident angle does not linearly change. For example, $$X(\phi = \phi_0)(\theta) = \frac{\tan \theta}{\sqrt{(\tan \theta)^2 + (\tan \phi_0)^2}} f \cdot \alpha$$

where $X(\phi=\phi_0)(\theta)$ is a coordinate of the scanning light beam in the scan direction for a scan angle $\theta$ of a light deflector when an oblique incident angle is $\phi_0$, f is a focal distance of the f-$\theta$ lens and $\alpha$ is an incident angle of the skewed light beam.

As a result, it is not possible to align the scan lines directed to the f-$\theta$ lens at different incident angles. Because of this disadvantage, where scan lines corresponding to different color developments are to be superimposed in a color LBP where a high precision of multicolor registration is required, color distortion takes place. For example, as shown in FIGS. 2 and 3, if scan lines having oblique incident angles of 2.5 degrees and 7.5 degrees are to be superimposed by correcting the bendings of the scan lines by the same second collimator lens (cylindrical lens), there occurs a displacement of 0.6 mm in the length of the scan line at the scan angle of 30 degrees (scan position 160 mm) with the f-$\theta$ lens which comprises the spherical lens system having a focal length of 313.55 mm, as shown in FIG. 4. If a correction is made to align the scan points in the vicinity of the scan angle of 30 degrees by the magnification in the scan direction, there occurs a displacement of approximately 60 $\mu$m in the scan line in the vicinity of the scan angle of 16 degrees, as shown by a curve a in FIG. 3. Even if balance is adjusted in the ± directions, there occurs a displacement of ±30-40 $\mu$m as shown by a curve b in FIG. 3. This corresponds to a displacement of one half pixel in a printer having a resolution of 400 DPI.

It is an object of the present invention to provide a light scanner which directs a plurality of laser beams to one scanning deflector to scan a plurality of scan planes with a good f-$\theta$ characteristic over an entire scan range, with a good optical characteristic with a small bending of image plane, and with a small displacement for the superposition of the scan points.

In accordance with the present invention, a plurality of laser beams are deflected by the single light deflector and directed to a first focusing system and focused by a first focusing lens. They are then directed to second focusing lenses which comprise anamorphic systems, arranged one for each of the laser beams in a vicinity of the scan plane. The laser beams from the second focusing lenses are directed to the respective scan planes. Refractive powers of the first focusing lens in the scan direction and the vertical direction on the scan plane are afocal.

BRIEF DESCRIPTION OF THE DRAWINGS

FIGS. 5A, 5B and 5C show schematic views of portions of FIG. 4 in scan direction and sub-scan direction.

DESCRIPTION OF THE PREFERRED EMBODIMENTS

Figure 1:
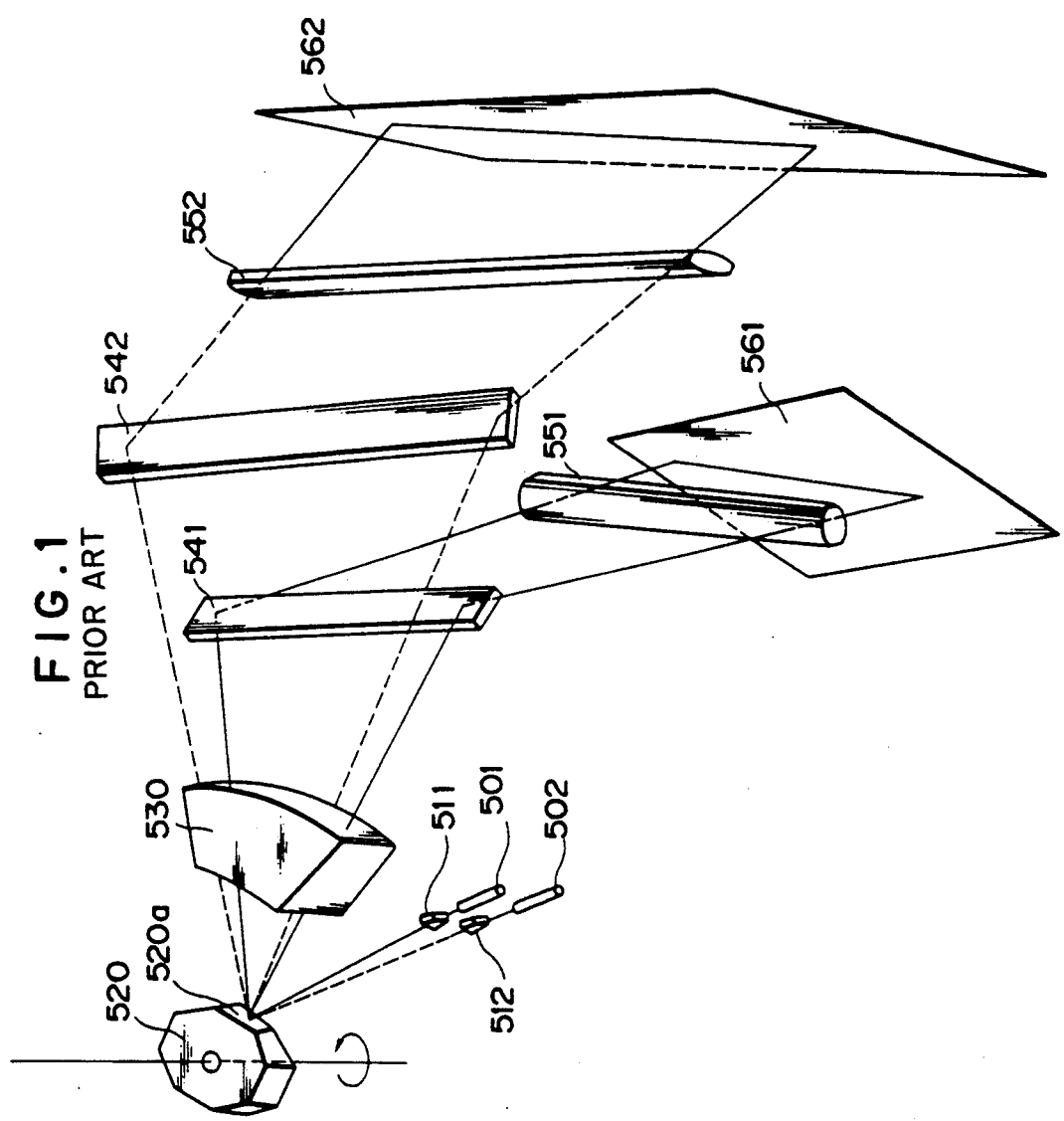
FIG. 1 shows a schematic view of a prior art light scanner.
Figure 2:
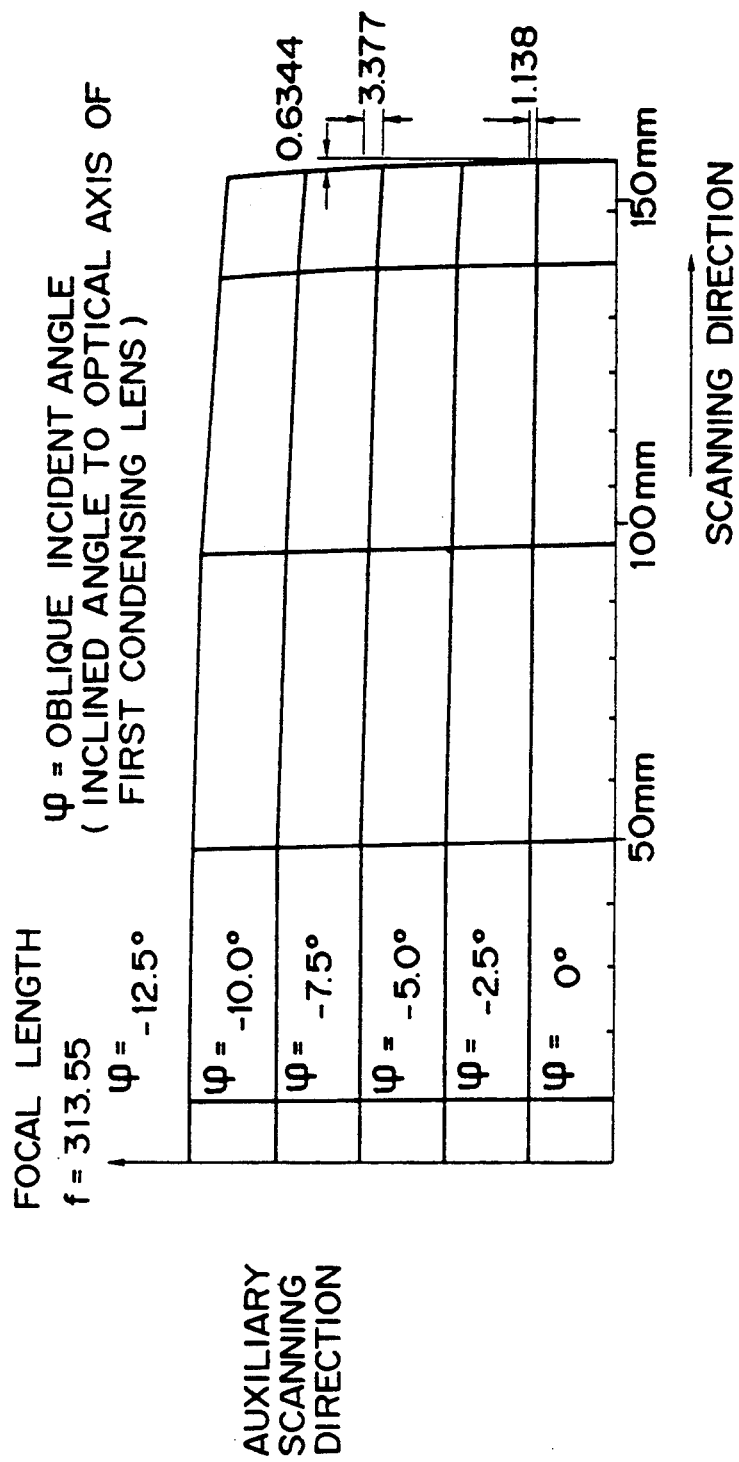
FIG. 2 illustrates an f-θ characteristic of a spherical f-θ lens.
Figure 3:
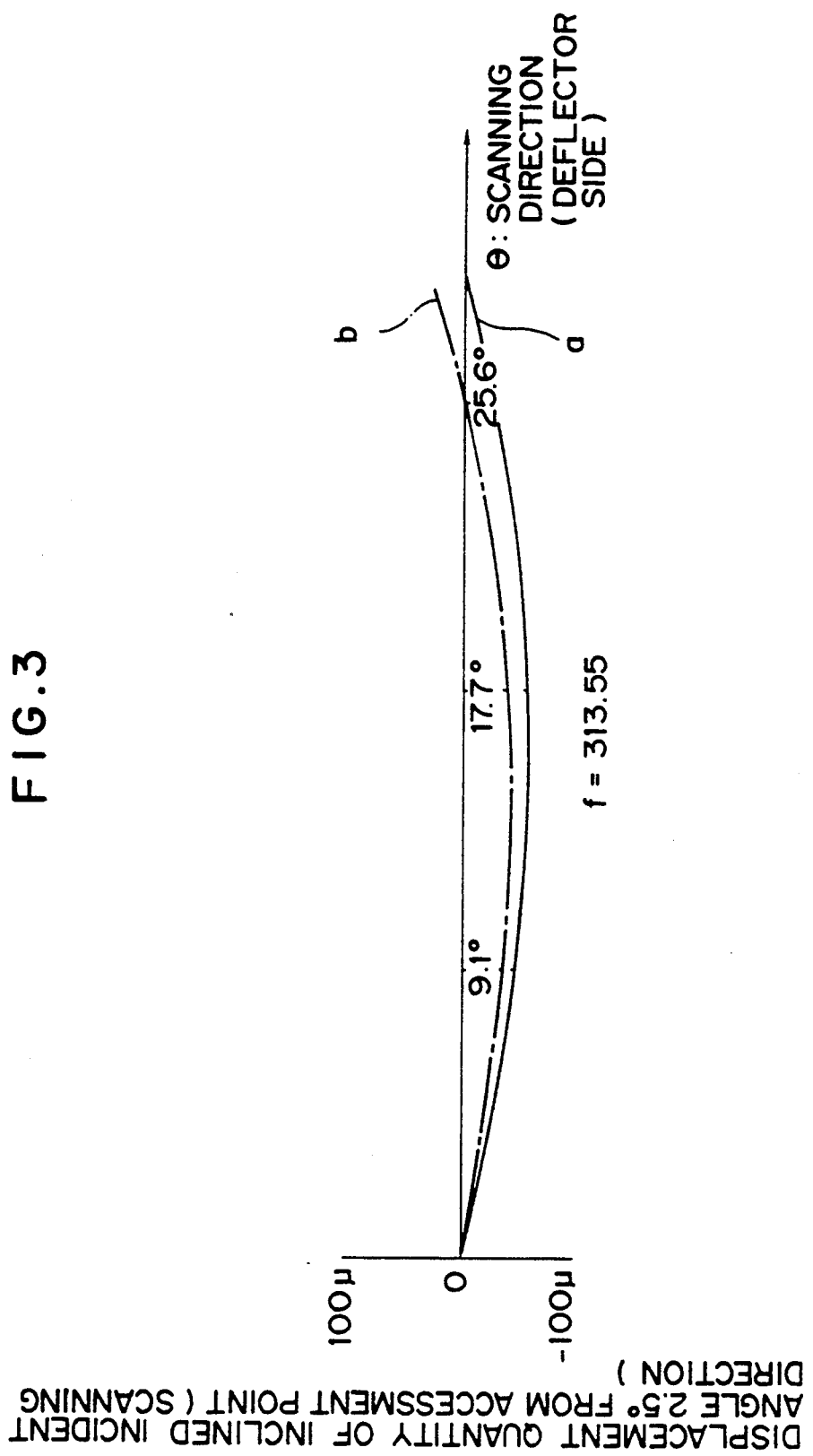
FIG. 3 illustrates correction of the f-θ characteristic of the spherical f-θ lens.
Figure 4:
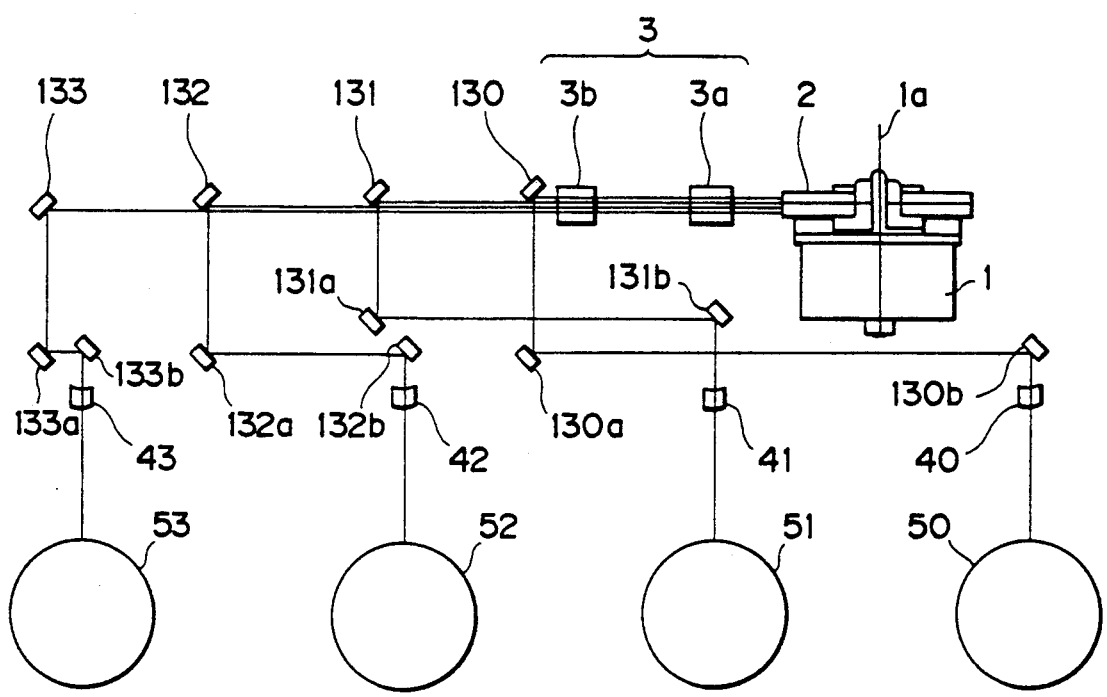
FIG. 4, shows a schematic view of one embodiment of the present invention.
Figure 5B:
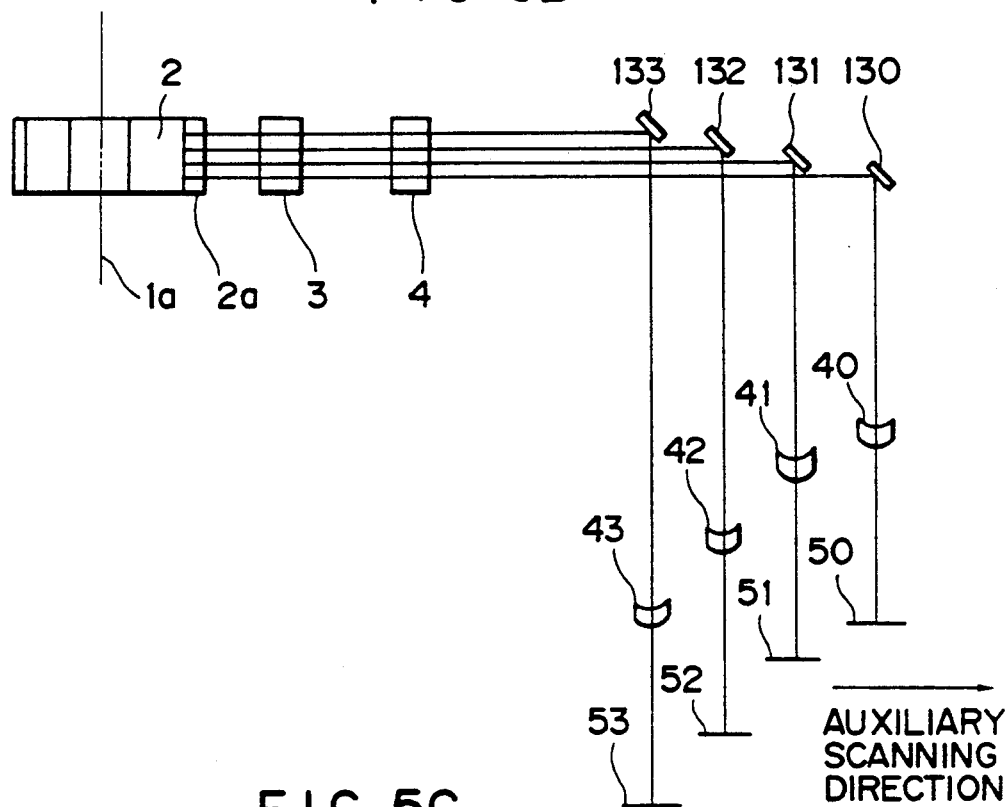
Figure 5C:
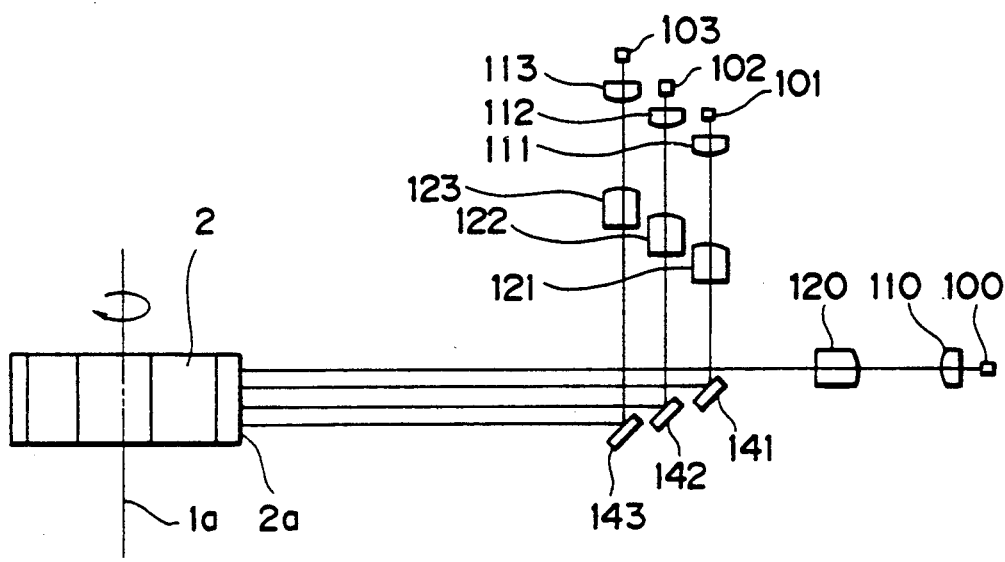

FIG. 4 shows a schematic view of one embodiment of the present invention. It is a sectional view taken along a direction normal to a scan direction. FIG. 5A shows a schematic view when a portion of FIG. 4 is developed in the scan direction and it shows a deflection plane. FIG. 5B shows a sectional schematic view of a portion of FIG. 4 in the direction normal to the scan direction (sub-scan direction), and it shows the plane normal to the deflection plane. FIG. 5C shows a sectional view of a portion of FIG. 4. The scan direction is defined as a direction along which a light beam deflected by a deflector scans on the scan plane.

In the present embodiment, four laser beams are used to scan the scan planes with different optical information. Numeral 1 denotes a motor and numeral 2 denotes a light deflector which has a rotating polygon mirror which is rotated by the motor 1 around a rotation axis 1a. Numerals 100-103 denote light emitting units of laser oscillators. A center light beam of each laser beams from each of the light emitting units 100-103 is directed to the light deflector 2 normally to the scan direction (along a sub-scan direction) by a mirror 141, 142 or 143. In FIG. 5A, only the light emitting unit 100 is shown. The center light beam of each laser beam is directed to a deflecting reflection plane of the deflector normally to the rotation axis 1a of the deflector. Numerals 110-113 denote collimator lenses which are provided one for each of the laser oscillators to collimate the laser beams emitted from the light emitting units 100-103. (In FIG. 5A, only the collimator lens 110 is shown.) Numerals 120-123 denote cylindrical lenses having a refractive power in the auxiliary scanning direction (sub-scan direction). (In FIG. 5A, only the cylindrical lens 120 is shown.) Numerals 141-143 denote mirrors which reflect three of the four light beams from the cylindrical lenses 120-123 and direct them to the deflecting reflection planes 2a of the light deflector 2. Numeral 3 denotes a first focusing lens system which comprises two lenses 3a and 3b and has an f-θ characteristic having a refractive power in the scan direction. It is afocal in the sub-scan direction. The center light beams of the laser beams are directed to the first focusing lens system 3 parallelly to an optical axis of the first focusing lens system and along an optical axis plane (a plane normal to the deflection plane of the deflector) of the first focusing lens system. The deflection plane is defined as a plane which is formed by the light beam deflected and reflected by the deflector. Numerals 131-133 denote mirrors which reflect the four laser beams directed from the first focusing lens system 3. Numerals 40-43 denote second focusing lenses which comprise anamorphic lenses and correct skews of the deflecting reflection planes of the light deflector 2 and correct a curvature of field (bendings of image planes) on scan planes 50-53.

They also focus the light beams in the sub-scan direction on the scan planes. Numerals 50-53 denote scan planes which may be drum-shaped photoconductors. Numerals 130a, 130b, 131a, 131b, 132a, 132b, 133a and 133b denote mirrors. Those mirrors are omitted in FIG. 5B for simplification purpose.

In the present embodiment, the deflecting reflection planes of the light deflector 2 and the scan planes 50-53 are conjugate to each other in the sub-scan direction, with the intervention of the second focusing lenses 40-43.

As a result, the deviation of the incident position of the laser beam on the scan plane, the displacement of the scan line in the sub-scan direction and the loss of scan line or multi-scan, due to the skew of the deflecting reflection planes of the light deflector 2, are prevented.

In the present embodiment, the second focusing lens comprising the anamorphic system may be a lens having a cylindrical surface or a lens having a toric surface. When the lens having the cylindrical surface is used, a skew correction for the deflecting reflection plane of the deflector may be effected. When the lens having the toric surface is used, the skew correction for the deflecting reflection plane of the deflector as well as the bending of the image plane of the scan line may be corrected.

In the present embodiment, the plane of the second focusing lens comprising the anamorphic system to which the light beam emanated from the first focusing lens system is directed is not planar. If it is planar, the light beam reflected by the plane would return to the laser to cause mode hopping of the laser. Further, since the light beam emanated from the first focusing lens is substantially collimated, a freedom of aberration correction would be reduced if the plane to which the collimated light beam is directed is planar. This is disadvantageous is correcting the aberration.

In the present embodiment, optical means such as mirrors are provided between the first focusing lens system and the second focusing lenses in order to separate the laser beams and direct them to the scan planes. Since it is difficult from the arrangement of lenses to direct the light beams from the first focusing lens system directly to the second focusing lenses provided one for each of the light beams, it is preferable to provide the optical means such as mirrors therebetween to separate the light beams. The mirrors are provided one for each of the light beams, as the second focusing lenses are.

In the present embodiment, four laser beams from the four light emitting units 100-103 are substantially collimated by the collimator lenses 110-113, and they are focused by the cylindrical lenses 120-123 in the sub-scan direction as shown in FIG. 5B. The four laser beams are reflected by the mirrors to direct them to the deflecting reflection planes of the light deflector 2. The four laser beams are then directed to the second focusing lenses 40-43 through the mirrors to direct them to the scan planes 40-43. The light deflector 2 is rotated to scan the scan planes 50-53.

Figure 6:
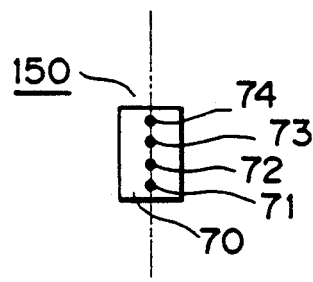
FIG. 6 illustrates a multi-beam generator.
Figure 7A:
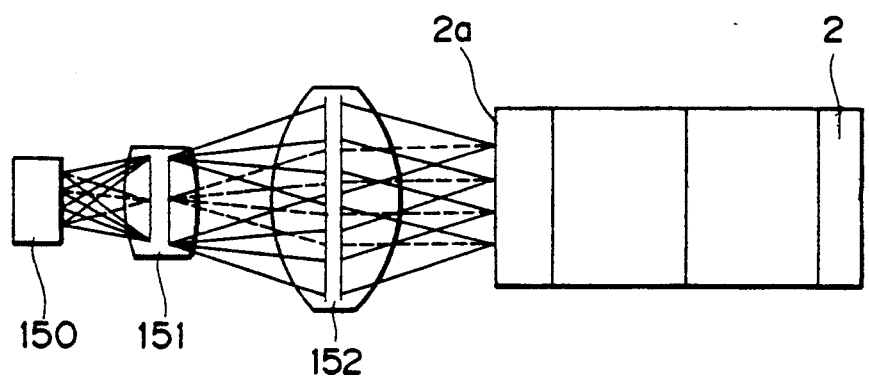
FIGS. 7A and 7B show schematic views of another embodiment of the present invention.
Figure 7B:
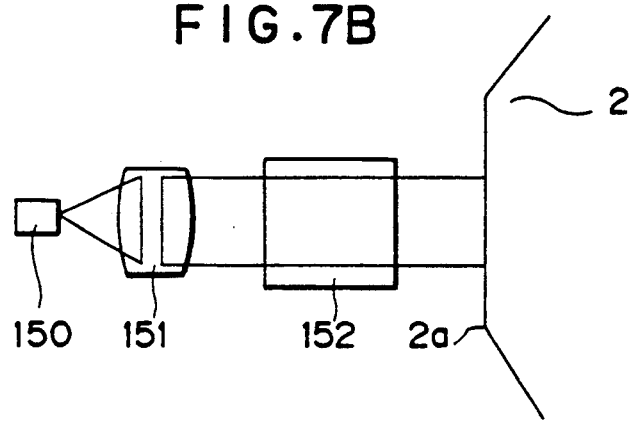

In the present embodiment, instead of using four laser oscillators, a single element as shown in FIG. 6, such as a multi-beam oscillator 150 having four light emitting units 71-74 linearly arranged in the sub-scan direction on a monolythic substrate 70 may be used to form the optical system as shown in FIGS. 7A and 7B. In FIGS. 7A and 7B, the four laser beams from the multi-beam oscillator 70 are collimated by a collimator lens 151 and directed to the deflecting reflection planes of the light deflector 2 by a cylindrical lens 152. The subsequent process is same as that of the embodiment shown in FIGS. 5A, 5B and 5C.

FIG. 7A shows a sectional view in the subscan direction, and FIG. 7B shows a sectional view in the scan direction.

For a reference purpose, optical data of the optical elements shown in FIG. 5A are shown below with the symbols used in FIG. 5A.

TABLE 1

R: 80  D: 14.65  $\alpha$: 22°  $\delta$: 44°
10-plane polygon

|  | Scan Direction | Sub-scan Direction |  |  |
|---|---|---|---|---|
| $r_1$ | ∞ | 100.086 | $d_1$ | 12.0 |
| $r_2$ | ∞ | ∞ | $d_2$ | 188.24 |
| $r_3$ | ∞ | ∞ | $d_3$ | 25.83 |
| $r_4$ | −270.84 | ∞ | $d_4$ | 18.70 |
| $r_5$ | ∞ | ∞ | $d_5$ | 40.85 |
| $r_6$ | ∞ | ∞ | $d_6$ | 16.18 |
| $r_7$ | −127.26 | ∞ | $d_7$ | 304.28 |
| $r_8$ | ∞ | −17.58 | $d_8$ | 7.99 |
| $r_9$ | −5620.45 | −11.27 | $d_9$ | 56.34 |

| $N_1$ | 1.51633 | (Wavelength = 780 nm) |
| $N_2$ | 1.72825 | (Wavelength = 780 nm) |
| $N_3$ | 1.64769 | (Wavelength = 780 nm) |
| $N_4$ | 1.49171 | (Wavelength = 780 nm) |
| f (Scan Direction) | | 313.55 |
| f (Sub-scan Direction) | | 45.65 |
| Effective FNo (Scan Direction) | | 65 |
| Effective FNo (Sub-scan Direction) | | 70 |

In the Table 1, R is a diameter of a circumscribed circle, D is a distance between the optical axis of the lens having the f-$\theta$ characteristic and the rotation axis of the light deflector in the deflection plane, $\alpha$ is an angle between the optical axis of the lens having the f-$\theta$ characteristic and the normal line to the deflection plane of the deflector when center light beam of the beam deflected by the deflecting reflection plane of the deflector coincides with the optical axis of the lens having the f-$\theta$ characteristic in the deflection plane, $\delta$ is an angle between the optical axis of the lens having the f-$\theta$ characteristic and the optical axis of the collimeter lens in the deflection plane, f is the focal length of the combination of the lens 3 having the f-$\theta$ characteristic and the anamorphic lens 40, the effective FNo is that for the combined lens, and $r_1$–$r_9$ are radius of curvature of the lens shown.

In accordance with the present invention, the first focusing lens system is constructed to exhibit the f-$\theta$ characteristic in the scan direction and to be afocal in the sub-scan direction to attain a light scanner which can scan a plurality of laser beams in the sub-scan direction with a high precision. Since the conditions of refractive power (environmental conditions) for the laser beams can be made uniform, the optical characteristics of the scan lines are unified. As a consequence, no displacement takes place when the scan lines are superimposed. Particularly in the color laser beam printer, a high image quality without color distortion is readily attained. Since the laser beam is directed to the optical axis plane of the first focusing lens system, high precision f-$\theta$ characteristic and good optical characteristic can be readily attained.

Figure 8:
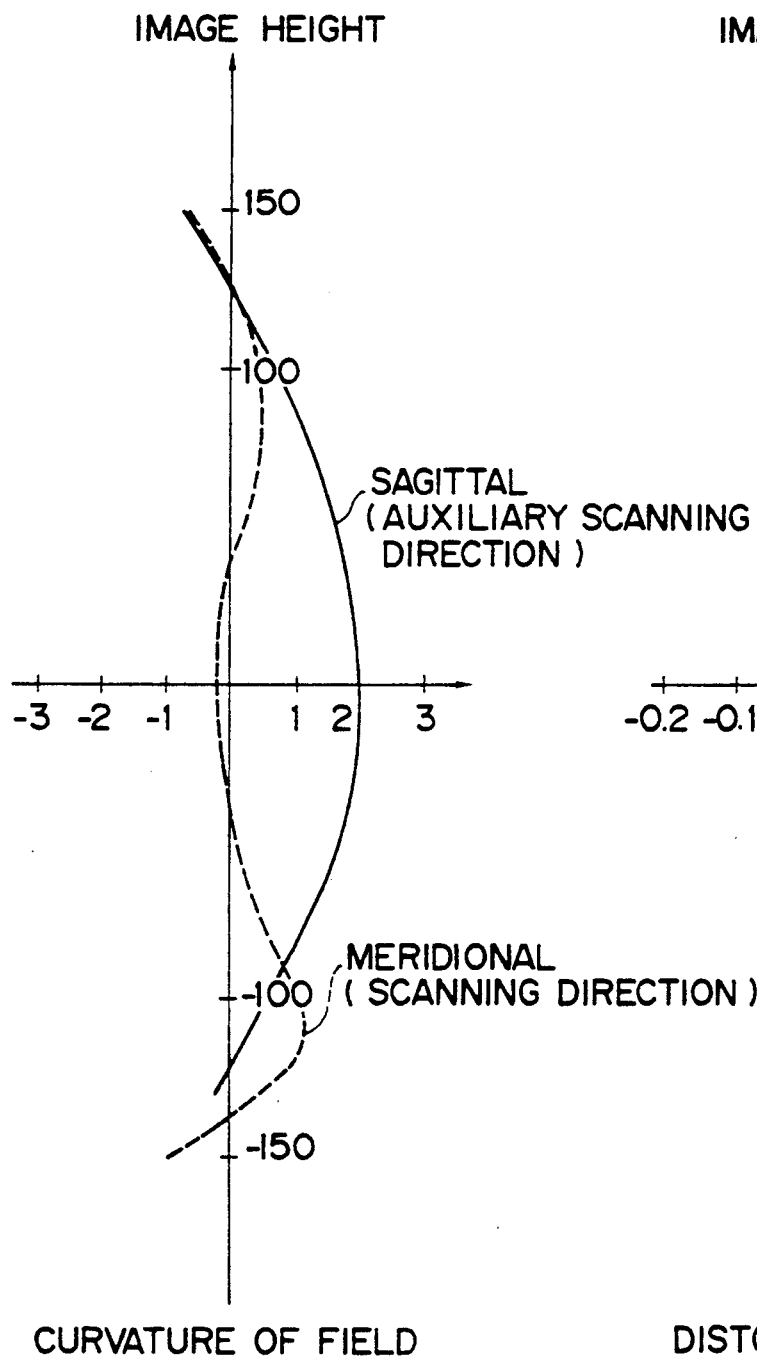
FIGS. 8 and 9 illustrate bending of image plane and distortion on the scan plane in the light scanner of the present invention.
Figure 9:
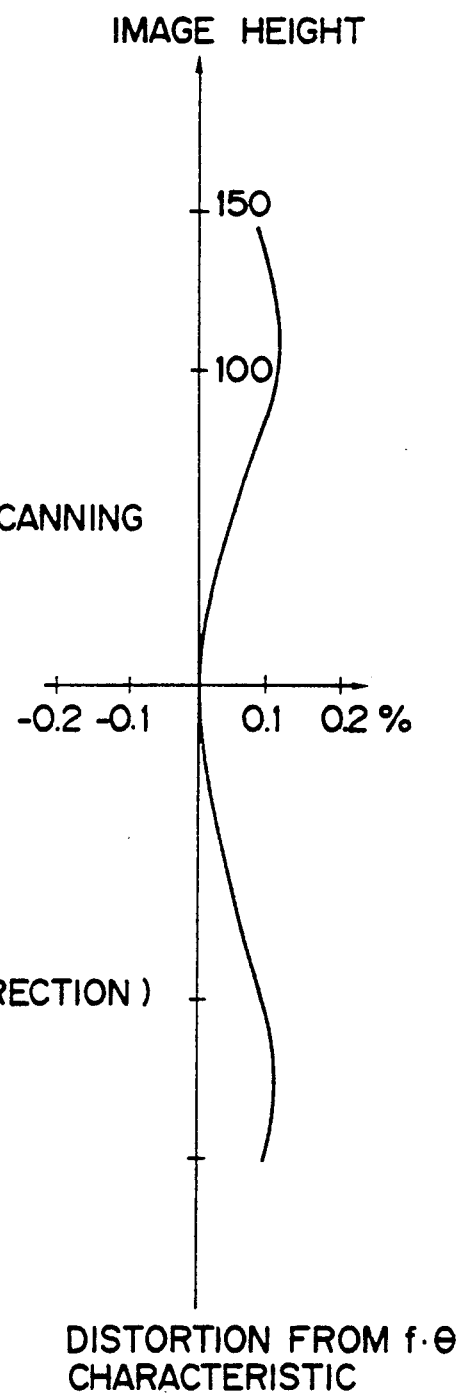

The second focusing lens has at least one toric plane to correct the bending of the image plane as shown in FIG. 8 and correct the distortion as shown in FIG. 9 so that the difference between the spot diameters at the center of the scan line and the end of the scan line is reduced. The compactness of the entire optical system is readily attained. When the single-element multi-beam oscillator is used, the size of the entire optical system can be further reduced.

I claim:

1. A light scanning apparatus comprising:
    a light source having a plurality of light emitting units;
    a deflector for deflecting a plurality of light beams emanated from said light source;
    a first optical system for focusing the plural light beams deflected by said deflector, said first optical system being afocal in a refractive power in a sub-scan direction and exhibiting an f-$\theta$ characteristic in a refractive power in a scan direction; and
    a second optical system positioned in proximity to a predetermined plane for directing the light beams from said first optical system to the predetermined plane, said second optical system being provided for each of the light beams.

2. A light scanning apparatus according to claim 1, wherein said second optical system is an anamorphic optical system having different refractive powers between the scan direction and the sub-scan direction.

3. A light scanning apparatus according to claim 2, wherein said second optical system has at least one toric plane.

4. A light scanning apparatus according to claim 2, wherein a deflecting reflection plane of said deflector and said predetermined plane are kept conjugate in the sub-scan direction by said second optical system.

5. A light scanning apparatus according to claim 1, wherein the light beams from said deflector are directed to said first optical system with center beams of the light beams being kept in parallel and along a plane normal to the deflection plane of said deflector.

6. A light scanning apparatus according to claim 1, wherein optical means is provided between said first optical system and said second optical system, for separating the light beams directed from said first optical system so as to direct the separated light beams to said second optical system.

7. A light scanning apparatus according to claim 1, wherein:
    said first optical system is commonly provided for said plurality of light beams.

8. A light scanning apparatus according to claim 1, wherein:
    said deflector rotates around a predetermined axis.

9. A light scanning apparatus according to claim 8, wherein:
    said plurality of light beams projected by said light source enter said deflector in a direction perpendicular to said predetermined axis.

10. A light scanning apparatus according to claim 1, wherein:
    said plurality of light beams projected by said light source enter said deflector in parallel.

11. A light scanning apparatus according to claim 1, wherein a respective one of plural predetermined planes is provided for each light beam.

12. A light scanning apparatus comprising:
a light source unit for generating a plurality of light beams;
deflecting means for deflecting said plurality of light beams emanated from said light source unit;
a first optical system on which the plurality of light beams deflected by said deflecting means are incident, said first optical system being afocal in a refractive power in a sub-scan direction; and
a second optical system positioned in proximity to a predetermined plane for directing the plurality of light beams from said first optical system to the predetermined plane, said second optical system being provided for each of said plurality of light beams.

13. A light scanning apparatus according to claim 12, wherein said second optical system is an anamorphic optical system having different refractive powers between the scan direction and the sub-scan direction.

14. A light scanning apparatus according to claim 13, wherein said second optical system has at least one toric plane.

15. A light scanning apparatus according to claim 13, wherein a deflecting reflection plane of said deflector and said predetermined plane are kept conjugate in the sub-scan direction by said second optical system.

16. A light scanning apparatus according to claim 12, wherein the light beams from said deflector are directed to said first optical system with center beams of the light beams being kept in parallel and along a plane normal to the deflection plane of said deflector.

17. A light scanning apparatus according to claim 12, wherein optical means is provided between said first optical system and said second optical system, for separating the light beams directed from said first optical system so as to direct the separated light beams to said second optical system.

18. A light scanning apparatus according to claim 12, wherein said first optical system is commonly provided for said plurality of light beams.

19. A light scanning apparatus according to claim 12, wherein said deflector rotates around a predetermined axis.

20. A light scanning apparatus according to claim 19, wherein said plurality of light beams projected by said light source enter said deflector in a direction perpendicular to said predetermined axis.

21. A light scanning apparatus according to claim 12, wherein said plurality of light beams projected by said light source enter said deflector in parallel.

22. A light scanning apparatus according to claim 12, wherein a respective one of plural predetermined planes is provided for each light beam.

23. A light scanning apparatus according to claim 12, wherein each of said plurality of light beams carries light information and the light information is different for each light beam.

24. A laser beam printer apparatus comprising:
a light source unit for generating a plurality of light beams;
deflecting means for deflecting said plurality of light beams emanated from said light source unit;
a recording medium for receiving the light beams deflected by said deflecting means;
a first optical system on which the plurality of light beams deflected by said deflecting means are incident, said first optical system being afocal in a refractive power in a sub-scan direction; and
a second optical system provided in proximity to said recording medium for directing the plurality of light beams from said first optical system to said recording medium, said second optical system being provided for each of said plurality of light beams.

25. A laser beam printer apparatus according to claim 24, wherein said first optical system is an optical system having a f-Θ characteristic in a refractive power in a scan direction.

26. A laser beam printer according to claim 25, wherein said second optical system is an anamorphic optical system having different refractive powers between the scan direction and the sub-scan direction.

27. A laser beam printer according to claim 26, wherein said second optical system has at least one toric plane.

28. A laser beam printer according to claim 26, wherein a deflecting reflection plane of said deflector and said recording medium are kept conjugate in the sub-scan direction by said second optical system.

29. A laser beam printer according to claim 25, wherein the light beams from said deflector are directed to said first optical system with center beams of the light beams being kept in parallel and along a plane normal to the deflection plane of said deflector.

30. A laser beam printer according to claim 25, wherein optical means is provided between said first optical system and said second optical system, for separating the light beams directed from said first optical system so as to direct the separated light beams to said second optical system.

31. A laser beam printer according to claim 25, wherein said first optical system is commonly provided for said plurality of light beams.

32. A laser beam printer according to claim 25, wherein said deflector rotates around a predetermined axis.

33. A laser beam printer according to claim 32, wherein said plurality of light beams projected by said light source enter said deflector in a direction perpendicular to said predetermined axis.

34. A laser beam printer according to claim 25, wherein said plurality of light beams projected by said light source enter said deflector in parallel.

35. A laser beam printer according to claim 24, wherein a respective one of plural recording media is provided for each of said plurality of light beams.

36. A laser beam printer according to claim 24, wherein each of said plurality of light beams carries light information and the light information is different for each light beam.

37. A scanning method in a light scanning apparatus, said method comprising the steps of:
deflecting a plurality of light beams by deflecting means;
directing said plurality of light beams deflected by said deflecting means to a first optical system which is afocal in a refractive power in a sub-scan direction; and
directing said plurality of light beams from said first optical system to a predetermined plane by a second optical system which is provided in proximity to the predetermined plane for each of said plurality of light beams.

38. A scanning method according to claim 37, wherein said first optical system is an optical system having a f-Θ characteristic in a refractive power in a scan direction.

39. A scanning method according to claim 38, wherein a respective one of plural predetermined planes is provided for each of said plurality of light beams.

40. A scanning method according to claim 38, wherein each of said plurality of light beams carries light information and the light information differs for each light beam.

41. A scanning method according to claim 38, further comprising the step of superposing each scanning line formed on said predetermined plane.

42. A recording method in a laser beam printer apparatus said method comprising the steps of:

deflecting a plurality of light beams by deflecting means;

directing said plurality of light beams deflected by said deflecting means to a first optical system which is afocal in a refractive power in a sub-scan direction; and directing said plurality of light beams from said first optical system to a recording medium by a second optical system which is provided in proximity to the recording medium for each of said plurality of light beams.

43. A recording method according to claim 42, wherein said first optical system is an optical system having a f-Θ characteristic in a refractive power in a scan direction.

44. A recording method according to claim 43, wherein a respective one of plural recording media is provided for each of said plurality of light beams.

45. A recording method according to claim 43, wherein each of said plurality of light beams carries light information and the light information differs for each light beam.

46. A recording method according to claim 43, further comprising the step of superposing each scanning line formed on said recording medium and forming a color image.

* * * * *